DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED SEPTEMBER 21, 1971

890 O.G. 980

T890,006

MONOMERIC PHOTOSENSITIZERS

Fulton Floyd Rogers, Jr., Richmond, Va., and Allen G. Kirk, Wilmington, Del., assignors to E. I. du Pont de Nemours and Company, Wilmington, Del.

Continuation of application Ser. No. 851,722, Aug. 20, 1969. This application June 18, 1970, Ser. No. 48,915

Int. Cl. B01j *1/00;* C08d *1/00*

U.S. Cl. 204—159.15

No Drawing. 9 Pages Specification

A process for photocrosslinking polymers selected from polypropylene, ethylene/sulfur dioxide copolymer, natural rubber, styrene-butadiene copolymer, chlorosulfonated polyethylene and ethylene/polypropylene/1,4-hexadiene terpolymer for the improvement of physical properties including broadening of heat sealing ranges, and increasing resistance to solvents; which process comprises incorporating into the polymer about from 0.1–10% by weight of monomeric p-acryloxybenzophenone and subsequently exposing the polymer to radiation having a wavelength of about from 2,000 to 7,000 angstroms.